United States Patent
Tabirian

(10) Patent No.: US 10,185,182 B2
(45) Date of Patent: Jan. 22, 2019

(54) MECHANICAL RUBBING METHOD FOR FABRICATING CYCLOIDAL DIFFRACTIVE WAVEPLATES

(71) Applicant: BEAM Engineering for Advanced Measurements Co., Orlando, FL (US)

(72) Inventor: Nelson Tabirian, Winter Park, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 1104 days.

(21) Appl. No.: 14/194,808

(22) Filed: Mar. 2, 2014

(65) Prior Publication Data

US 2015/0248041 A1 Sep. 3, 2015
US 2018/0059489 A9 Mar. 1, 2018

Related U.S. Application Data

(60) Provisional application No. 61/771,895, filed on Mar. 3, 2013.

(51) Int. Cl.
*G02F 1/1337* (2006.01)
*G02B 5/30* (2006.01)

(52) U.S. Cl.
CPC ..... *G02F 1/133784* (2013.01); *G02B 5/3016* (2013.01); *G02B 5/3083* (2013.01)

(58) Field of Classification Search
CPC ............. G02F 1/1337; G02F 1/133784; G02B 5/3016; G02B 5/3083
USPC ....................................................... 349/126
See application file for complete search history.

(56) References Cited

U.S. PATENT DOCUMENTS

| | | | | |
|---|---|---|---|---|
| 2,435,616 A | * | 2/1948 | Vittum | G03C 7/3335 430/378 |
| 3,721,486 A | * | 3/1973 | Bramley | G02B 5/1828 359/201.1 |
| 3,897,136 A | * | 7/1975 | Bryngdahl | G02B 27/60 250/237 G |
| 4,160,598 A | * | 7/1979 | Firester | G01J 9/02 356/121 |
| 4,301,023 A | * | 11/1981 | Schuberth | A61K 8/0295 252/299.7 |

(Continued)

FOREIGN PATENT DOCUMENTS

| | | |
|---|---|---|
| EP | 1970734 | 9/2008 |
| EP | 2088456 | 12/2009 |

(Continued)

OTHER PUBLICATIONS

Pagliusi et al. Surface-induced photorefractivity in twistable nematics: toward the all-optical control of gain, Opt. Expr. vol. 16, Oct. 2008, 9 pages.

(Continued)

*Primary Examiner* — Kevin R Kruer
(74) *Attorney, Agent, or Firm* — Brian S. Steinberger; Law Offices of Brian S. Steinberger, P.A.

(57) ABSTRACT

Cycloidal boundary conditions for aligning liquid crystalline materials are obtained by mechanical rubbing of a polymer coating. The rubbing is performed by a rubbing head rotating around an axis perpendicular to the rubbing plane while the alignment polymer film is being translated across the rubbing film such as only a linear portion of the alignment film touches the rubbing film at any given time.

14 Claims, 7 Drawing Sheets

(56) References Cited

U.S. PATENT DOCUMENTS

| | | | | |
|---|---|---|---|---|
| 4,698,816 A * | 10/1987 | Chun | | G02B 26/06 359/257 |
| 4,956,141 A * | 9/1990 | Allen | | B29C 33/68 264/297.2 |
| 4,983,332 A * | 1/1991 | Hahn | | B29C 33/62 264/1.1 |
| 5,032,009 A * | 7/1991 | Gibbons | | C09K 19/56 349/124 |
| 5,042,950 A * | 8/1991 | Salmon, Jr. | | G01J 9/0215 356/520 |
| 5,047,847 A * | 9/1991 | Toda | | A61B 1/05 348/345 |
| 5,100,231 A * | 3/1992 | Sasnett | | G01J 1/4257 356/121 |
| 5,142,411 A * | 8/1992 | Fiala | | A61F 2/1618 359/489.18 |
| 5,150,234 A * | 9/1992 | Takahashi | | G02B 3/14 349/1 |
| 5,218,610 A * | 6/1993 | Dixon | | H01S 3/082 372/20 |
| 5,325,218 A * | 6/1994 | Willett | | G02F 1/13473 349/74 |
| 5,446,596 A * | 8/1995 | Mostrorocco | | A61F 2/1691 351/227 |
| 5,621,525 A * | 4/1997 | Vogeler | | G01J 1/4257 356/450 |
| 5,895,422 A * | 4/1999 | Hauber | | A61F 2/1613 351/159.11 |
| 5,903,330 A * | 5/1999 | Funfschilling | | G02B 5/3016 349/127 |
| 5,989,758 A * | 11/1999 | Komatsu | | C08G 63/60 428/1.33 |
| 6,107,617 A * | 8/2000 | Love | | G01J 9/00 250/201.9 |
| 6,139,147 A * | 10/2000 | Zhang | | G02B 5/32 264/1.31 |
| 6,170,952 B1 * | 1/2001 | La Haye | | C08G 18/758 351/159.41 |
| 6,191,880 B1 * | 2/2001 | Schuster | | G02B 5/3083 359/237 |
| 6,219,185 B1 * | 4/2001 | Hyde | | B64G 1/105 244/3.16 |
| 6,320,663 B1 * | 11/2001 | Ershov | | G01J 1/4257 356/454 |
| 6,373,549 B1 * | 4/2002 | Tombling | | G02F 1/292 349/119 |
| 6,452,145 B1 * | 9/2002 | Graves | | G01J 9/00 250/201.9 |
| 6,551,531 B1 * | 4/2003 | Ford | | B29D 11/00125 249/117 |
| 6,678,042 B2 | 1/2004 | Tabirian et al. | | |
| 6,728,049 B1 * | 4/2004 | Tabirian | | G02B 7/006 359/819 |
| 6,792,028 B2 * | 9/2004 | Cook | | G02B 26/0808 372/100 |
| 6,911,637 B1 * | 6/2005 | Vorontsov | | G01J 9/00 250/201.9 |
| 7,048,619 B2 * | 5/2006 | Park | | G02F 1/133784 349/124 |
| 7,094,304 B2 * | 8/2006 | Nystrom | | B29D 11/00 156/242 |
| 7,095,772 B1 * | 8/2006 | Delfyett | | H01S 5/50 359/333 |
| 7,196,758 B2 * | 3/2007 | Crawford | | G02F 1/133788 349/123 |
| 7,319,566 B2 * | 1/2008 | Prince | | G02B 7/1805 359/822 |
| 7,324,286 B1 * | 1/2008 | Glebov | | G02F 1/135 359/30 |
| 7,450,213 B2 * | 11/2008 | Kim | | G02F 1/1303 349/187 |
| 7,482,188 B2 * | 1/2009 | Moon | | B24B 7/228 257/E31.001 |
| 7,764,426 B2 * | 7/2010 | Lipson | | G02B 27/286 353/20 |
| 8,045,130 B2 * | 10/2011 | Son | | G02F 1/133784 349/126 |
| 8,077,388 B2 * | 12/2011 | Gerton | | G02B 5/3041 359/486.03 |
| 8,264,623 B2 | 9/2012 | Marrucci | | |
| 8,520,170 B2 * | 8/2013 | Escuti | | G02B 5/3016 349/5 |
| 8,582,094 B1 * | 11/2013 | Shortt | | G01N 21/9501 356/237.1 |
| 8,643,822 B2 * | 2/2014 | Tan | | B29D 11/0074 349/129 |
| 8,937,701 B2 * | 1/2015 | Rossini | | G02F 1/1313 345/32 |
| 8,982,313 B2 | 3/2015 | Escuti et al. | | |
| 9,541,772 B2 | 1/2017 | De Sio et al. | | |
| 9,557,456 B2 | 1/2017 | Tabirian | | |
| 9,592,116 B2 * | 3/2017 | De Sio | | G02C 7/04 |
| 9,617,205 B2 | 4/2017 | Tabirian | | |
| 9,658,512 B2 | 5/2017 | Tabirian | | |
| 9,715,048 B2 | 7/2017 | Tabirian | | |
| 9,753,193 B2 | 9/2017 | Tabirian | | |
| 10,031,424 B2 | 7/2018 | Tabirian | | |
| 10,036,886 B2 | 7/2018 | Tabirian | | |
| 10,075,625 B2 | 9/2018 | Tabirian | | |
| 10,107,945 B2 | 10/2018 | Tabirian et al. | | |
| 10,114,239 B2 | 10/2018 | Tabirian et al. | | |
| 10,120,112 B2 | 11/2018 | Tabirian et al. | | |
| 2001/0002895 A1 * | 6/2001 | Kawano | | G11B 7/006 369/103 |
| 2001/0018612 A1 * | 8/2001 | Carson | | A61F 2/1648 623/5.11 |
| 2001/0030720 A1 * | 10/2001 | Ichihashi | | G02B 5/3016 349/106 |
| 2002/0027624 A1 * | 3/2002 | Seiberle | | G02B 5/3016 349/73 |
| 2002/0097361 A1 * | 7/2002 | Ham | | G02F 1/134363 349/129 |
| 2002/0167639 A1 * | 11/2002 | Coates | | B29C 33/68 349/187 |
| 2003/0021526 A1 * | 1/2003 | Bouevitch | | G02B 6/2713 385/24 |
| 2003/0072896 A1 * | 4/2003 | Kwok | | C09B 35/14 428/1.23 |
| 2003/0152712 A1 * | 8/2003 | Motomura | | C09K 19/3852 427/402 |
| 2003/0206288 A1 * | 11/2003 | Tabirian | | G01J 1/4257 356/121 |
| 2003/0214700 A1 * | 11/2003 | Sidorin | | H01S 5/146 359/334 |
| 2003/0218801 A1 * | 11/2003 | Korniski | | G01J 3/02 359/407 |
| 2004/0051846 A1 * | 3/2004 | Blum | | G02C 7/049 351/159.41 |
| 2004/0105059 A1 * | 6/2004 | Ohyama | | G02F 1/133555 349/114 |
| 2004/0165126 A1 * | 8/2004 | Ooi | | G02B 5/1814 349/96 |
| 2005/0030457 A1 * | 2/2005 | Kuan | | G02F 1/133784 349/126 |
| 2005/0110942 A1 * | 5/2005 | Ide | | G02B 6/266 349/193 |
| 2005/0219696 A1 * | 10/2005 | Albert | | G02B 5/3058 359/486.01 |
| 2005/0271325 A1 * | 12/2005 | Anderson | | G02F 1/295 385/40 |
| 2005/0280717 A1 * | 12/2005 | Sugimoto | | H04N 1/32128 348/222.1 |
| 2006/0008649 A1 * | 1/2006 | Shinichiro | | B32B 7/06 428/411.1 |
| 2006/0055883 A1 * | 3/2006 | Morris | | A61F 2/1613 351/159.44 |

(56) References Cited

U.S. PATENT DOCUMENTS

| | | | |
|---|---|---|---|
| 2006/0109532 A1* | 5/2006 | Savas | G02B 5/1857 359/10 |
| 2006/0221449 A1* | 10/2006 | Glebov | G02B 6/02085 359/575 |
| 2006/0222783 A1* | 10/2006 | Hayashi | C09K 19/3852 428/1.1 |
| 2007/0032866 A1* | 2/2007 | Portney | A61F 2/1613 623/6.31 |
| 2007/0040469 A1* | 2/2007 | Yacoubian | G01N 21/1702 310/311 |
| 2007/0115551 A1* | 5/2007 | Spilman | G02B 27/286 359/489.07 |
| 2007/0122573 A1* | 5/2007 | Yasuike | B65D 33/2541 428/34 |
| 2007/0132930 A1* | 6/2007 | Ryu | G02F 1/1303 349/126 |
| 2007/0247586 A1* | 10/2007 | Tabirian | G02B 26/0825 349/200 |
| 2007/0258677 A1* | 11/2007 | Chigrinov | G02B 6/12007 385/15 |
| 2008/0226844 A1* | 9/2008 | Shemo | G02B 5/3016 428/1.1 |
| 2008/0278675 A1* | 11/2008 | Escuti | G02B 5/1833 349/201 |
| 2009/0002588 A1* | 1/2009 | Lee | G02F 1/133707 349/42 |
| 2009/0073331 A1* | 3/2009 | Shi | G02F 1/292 349/18 |
| 2009/0122402 A1* | 5/2009 | Shemo | G02B 5/3025 359/486.02 |
| 2009/0141216 A1* | 6/2009 | Marrucci | G02F 1/0305 349/98 |
| 2009/0201572 A1* | 8/2009 | Yonak | G02B 1/00 359/316 |
| 2009/0256977 A1* | 10/2009 | Haddock | B29D 11/00028 349/13 |
| 2009/0257106 A1* | 10/2009 | Tan | G02B 27/48 359/279 |
| 2009/0264707 A1* | 10/2009 | Hendriks | A61B 5/0059 600/181 |
| 2010/0003605 A1* | 1/2010 | Gil | G03F 7/70466 430/1 |
| 2010/0066929 A1* | 3/2010 | Shemo | G02B 5/3083 349/18 |
| 2010/0245954 A1* | 9/2010 | Ahling | G02F 1/133784 359/30 |
| 2011/0069377 A1* | 3/2011 | Wu | G02B 1/007 359/356 |
| 2011/0075073 A1* | 3/2011 | Oiwa | G02F 1/13718 349/76 |
| 2011/0085117 A1* | 4/2011 | Moon | B24B 7/228 349/126 |
| 2011/0097557 A1* | 4/2011 | May | C08J 7/047 428/195.1 |
| 2011/0109874 A1* | 5/2011 | Piers | A61F 2/1621 351/159.06 |
| 2011/0135850 A1* | 6/2011 | Saha | C08F 220/30 428/1.23 |
| 2011/0188120 A1* | 8/2011 | Tabirian | G02B 27/44 359/573 |
| 2011/0234944 A1* | 9/2011 | Powers | C09K 19/544 349/86 |
| 2011/0262844 A1* | 10/2011 | Tabirian | G02B 5/3083 430/2 |
| 2012/0075168 A1* | 3/2012 | Osterhout | G02B 27/017 345/8 |
| 2012/0140167 A1* | 6/2012 | Blum | A61F 2/1624 351/159.34 |
| 2012/0162433 A1* | 6/2012 | Fuentes Gonzalez | G03B 15/07 348/151 |
| 2012/0188467 A1* | 7/2012 | Escuti | G02B 27/286 349/1 |
| 2013/0057814 A1* | 3/2013 | Prushinskiy | G02F 1/133784 349/123 |
| 2013/0202246 A1* | 8/2013 | Meade | G02B 6/30 385/14 |
| 2014/0055740 A1* | 2/2014 | Spaulding | G02C 7/021 351/159.02 |
| 2014/0211145 A1* | 7/2014 | Tabirian | G02F 1/292 349/201 |
| 2014/0252666 A1* | 9/2014 | Tabirian | B29D 11/00788 264/1.34 |
| 2015/0049487 A1* | 2/2015 | Connor | F21V 33/0076 362/277 |
| 2015/0081016 A1* | 3/2015 | De Sio | G02C 7/04 623/6.22 |
| 2015/0276997 A1* | 10/2015 | Tabirian | G02B 5/1828 359/573 |
| 2016/0011564 A1 | 1/2016 | Tanabe et al. | |
| 2016/0023993 A1 | 1/2016 | Tabirian | |
| 2016/0047955 A1* | 2/2016 | Tabirian | G02C 7/022 359/489.07 |
| 2016/0047956 A1 | 2/2016 | Tabirian | |
| 2016/0209560 A1 | 7/2016 | Tabirian et al. | |
| 2016/0231592 A9* | 8/2016 | Beaton | A61F 2/1627 |
| 2016/0363484 A1* | 12/2016 | Barak | G01J 9/02 |
| 2017/0010397 A1* | 1/2017 | Tabirian | G02B 5/3016 |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

M. Honma, T. Nose, Polarization-independent liquid crystal grating fabricated by microrubbing process, Jpn. J. Appl. Phys., Part 1, vol. 42, 2003, 3 pages.

Anderson, G., et al., Broadband Antihole Photon Sieve Telescope, Applied Optics, vol. 16, No. 18., Jun. 2007, 3 pages.

Early, J. et al., Twenty Meter Space Telescope Based on Diffractive Fresnel Lens, SPIE, U.S. Department of Energy, Lawrence Livermore National Laboratory, Jun. 2003, 11 pages.

Martinez-Cuenca, et al., Reconfigurable Shack-Hartmann Sensor Without Moving Elements,Optical Society of America, vol. 35, No. 9, May 2010, 3 pages.

Serak, S., et al., High-efficiency 1.5 mm Thick Optical Axis Grating and its Use for Laser Beam Combining, Optical Society of America, vol. 32, No., Jan. 2007, 4 pages.

Ono et al., Effects of phase shift between two photoalignment substances on diffration properties in liquid crystalline grating cells, Appl. Opt. vol. 48, Jan. 2009, 7 pgs.

Naydenova et al., "Diffraction form polarization holographic gratings with surface relief in side chain azobenzene polyesters" J. Opt. Soc. Am. B, vol. 15, (1998), 14 pages.

Oh et al., Achromatic polarization gratings as highly efficent thin-film polarizing beamsplitters for broadband light Proc. SPIE vol. 6682, (2007), 4 pages.

Nersisyan, S., et al., Polarization insensitive imaging through polarization gratins, Optics Express, vol. 17, No. 3, Feb. 2, 2009, 14 pages.

Tabirian, et al., The Promise of Diffractive Waveplates, OPN Optics and Photonics News, Mar. 2010, 6 pages.

Tabiryan, et al., Fabricating Vector Vortex Waveplates for Coronagraphy, 2012, 12 pages.

Tabirian, N., et al., PCT Application No. PCT/US15/26186 filed Apr. 16, 2015, Notification of Transmittal of the International Search Report and the Written Opinion of the International Searching Authority dated Jul. 14, 2015, 17 pages.

(56) References Cited

OTHER PUBLICATIONS

Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.
Nersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst., vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett, 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1997, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Marrucci, et al., Pancharatnam-Berry phase optical elements for wave front shaping in the visible domain, Appl. Phys. Lett. 88, 2006, 3 pages.
Stalder, et al., Lineraly polarized light with axial symmetry generated by liquid-crystal polarization converters, Optics Letters vol. 21, No. 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
OISE, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.

(56) References Cited

OTHER PUBLICATIONS

Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering for Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microorubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.
Sobolewska et al., "On the inscription of period and half period surface relief gratings in azobenzene-functionalized polymers", J. Phys. Chem., vol. 112 (15) Jan. 3, 2008, 10 pages.
Barrett et al., Model of laser driven mass transport in thin films of dye-functionalized polymers, J. Chem. Phys., vol. 109 (4), Jul. 22, 1998, 13 pages.
Tabirian, U.S. Appl. No. 14/214,375, filed Mar. 14, 2014, Office Action Summary dated Jun. 27, 2017, 10 pages.
Tabirian, et al., U.S. Appl. No. 14/688,425, filed Apr. 16, 2015, Office Action Summary dated Oct. 5, 2017, 10 pages.
Serak, et al. Diffractive Waveplate Arrays [Invited], Journal of the Optical Society of America B, May 2017, pp. B56-B63, vol. 34, No. 5, 8 pages.
Emoto, Optical and Physical Applications of Photocontrollable Materials: Azobenzene-Containing and Liquid Crystalline Polymers, Polymers, Jan. 2012, 150-186, vol. 4, 38 pages.
Pepper, M. et al, Nonlinear Optical Phase Conjugation, IEEE, Sep. 1991, pp. 21-34, 14 pages.
Tabirian, N., Utility U.S. Appl. No. 14/194,808, filed Mar. 2, 2014, Office Action Summary dated Feb. 9, 2018, 10 pages.
Tabirian, N., Utility U.S. Appl. No. 14/324,126, filed Jul. 4, 2014, Office Action Summary dated Feb. 8, 2018, 13 pages.
De Sio, L., et al., "Digital Polarization Holography Advancing Geometrical Phase Optics," 2016, Optics Express, vol. 24, Issue 16, pp. 18297-18306, 10 pages.
Borek, G. and D. Brown, "High-performance diffractive optics for beam shaping," 1999, Proceeding of SPIE, vol. 3633, pp. 51-60, 10 pages.
Gerchberg, et al, practical algorithm for the determination of the phase from image and diffraction plane pictures, 1972, Optik, vol. 35, Issue 2, pp. 237-246, 10 pages.
Tabirian, N., Utility U.S. Appl. No. 15/189,551, filed Jun. 22, 2016, Office Action Summary dated Feb. 27, 2018, 16 pages.
Tabirian, et al, U.S. Appl. No.: 14/688,197 filed Apr. 16, 2015, Office Action Summary dated Aug. 6, 2018, 19 pages.
Tabirian, et al, U.S. Appl. No.: 15/621,553 filed Jun. 13, 2017, Office Action Summary dated Aug. 7, 2018, 11 pages.

* cited by examiner

MECHANICAL RUBBING METHOD FOR FABRICATING CYCLOIDAL DIFFRACTIVE WAVEPLATES

CROSS REFERENCES

U.S. Patent Documents

U.S. Pat. No. 7,048,619 May 2006 Park et al.
U.S. Pat. No. 8,045,130 October 2011 Son, et al.

RELATED APPLICATIONS

This application claims the benefit of priority to U.S. Provisional Application No. 61/771,895 filed Mar. 3, 2013, the contents of which are relied upon and incorporated herein.

FIELD OF THE INVENTION

This invention relates to fabrication of liquid crystal, including liquid crystal polymer diffractive waveplates (DWs) with the aid of mechanical rubbing. DWs are used in imaging, sensor, communication, photonics, laser and display technologies.

BACKGROUND OF THE INVENTION

The structure of one of the optical components of interest is schematically shown in FIG. 1. Essentially, it is an optically anisotropic film 100 with the optical axis orientation 101 rotating in the plane of the film, the x,y plane in FIG. 1. In simplest realization, the rotation angle α of the optical axis orientation is a linear function of a single coordinate, $\alpha = \pi x/\Lambda$ with $\Lambda$ characterizing the period of the pattern. The thickness L of the film is defined by half-wave phase retardation condition $L = \lambda/n_\parallel - n_\perp$), where $n_\parallel$ and $n_\perp$ are the principal values of the refractive indices of the material; and λ is the radiation wavelength. Such a structure imposes a phase shift $$\Phi = \pm 2\alpha(x,y)$$

on circular polarized beams propagating through it with the sign depending on the handedness of polarization. With account of $\alpha = 2\pi x/\Lambda = qx$, where $q = 2\pi/\Lambda$, an unpolarized beam is thus diffracted into $+/-1^{st}$ diffraction orders with the magnitude of the diffraction angle equal to $\lambda/\Lambda$. The phase Φ in the equation above, known as geometrical or Pancharatnam phase, does not depend on wavelength, hence the broadband nature of the diffraction. Due to its half-wave plate nature, there are well developed techniques for making the component essentially achromatic in a wide range of wavelengths.

Obtaining large diffraction angles requires that the optical axis modulation period Λ be comparable to the wavelength λ. Liquid crystals (LCs) are the only materials that allow obtaining continuous optical axis modulation patterns at micrometer scale and in a technologically efficient manner. Moreover, due to record high optical anisotropy, $\Delta n = n_\parallel - n_\perp \sim 0.1$, the thickness of the film providing 100% diffraction efficiency is also comparable to the wavelength.

The molecules of a LC material are easily aligned along an anisotropy axis of a substrate. There are two major techniques for inducing structural anisotropy on a substrate. In the photoalignment technique demonstrated in FIG. 2, in a first step, the substrate 200 is coated with a material that creates a thin layer 202 (~10-100 nm) of random distribution of molecules 203. Due to absorption dichroism, the molecules are aligning according to the polarization of typically UV light beam 210, parallel or perpendicular, depending on the so-called photoalignment material, FIG. 2B. Perpendicular aligned molecules 204 is shown in FIG. 2B for certainty. Lastly, the substrate is coated with LC layer 220 the molecules wherein 221 align along the anisotropy axis produced in the photoalignment material 202, FIG. 2C. The LC can be polymerizable for some applications.

The cycloidal polarization modulation pattern is typically obtained holographically in the overlap region of right- and left-circular polarized beams. Holographic technique requires expensive lasers providing coherent beams, optics and opto-mechanical stabilization systems. Radiation power and beam size limitations limit the use of the technique to small components only. The materials used for photoalignment are also expensive, not widely available, and often do not provide strong enough orientation conditions for LC molecules.

Thus, there is a need for a technique that would allow fabricating DWs with the aid of mechanical rubbing of inexpensive polymer films well-developed and commonly used for liquid crystal display technologies. There is a wide prior art related to mechanical rubbing, as for example evident from the U.S. Pat. No. 7,048,619 to Park et al. or U.S. Pat. No. 8,045,130 to Son, et al. However, to the best of our knowledge none addressed the opportunity for producing general patterns with high spatial resolution.

BRIEF SUMMARY OF THE INVENTION

The objective of the present invention is providing a method for producing boundary conditions for cycloidal alignment of liquid crystalline materials by mechanically rubbing a substrate coated by an alignment polymer.

The second objective of the present invention is using the mechanical rubbing technique for fabrication of cycloidal diffractive waveplates, particularly, large area waveplates.

The third objective of the invention is providing a method for producing boundary conditions for nonlinearly patterned alignment of liquid crystalline materials by mechanically rubbing a substrate coated by an alignment polymer.

The fourth objective of the present invention is using the mechanical rubbing technique for fabrication of diffractive waveplates with nonlinear alignment patterns.

Still another objective of the present invention is producing patterned boundary conditions with high spatial resolution using mechanical rubbing.

DETAILED DESCRIPTION OF THE INVENTION

Before explaining the disclosed embodiment of the present invention in detail it is to be understood that the invention is not limited in its application to the details of the particular arrangement shown since the invention is capable of other embodiments. Also, the terminology used herein is for the purpose of description and not limitation.

Figure 1:
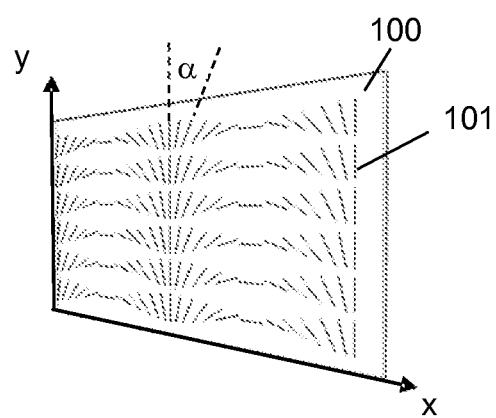
FIG. 1 schematically shows the structure of a cycloidal diffractive waveplate (CDW): The angle α made by the optical axis of an anisotropic material (liquid crystal) with a coordinate axis in x,y plane varies along a single coordinate (x), $\alpha = \pi x/\Lambda$, where Λ is the period of the optical axis rotation in space.
Figure 2:
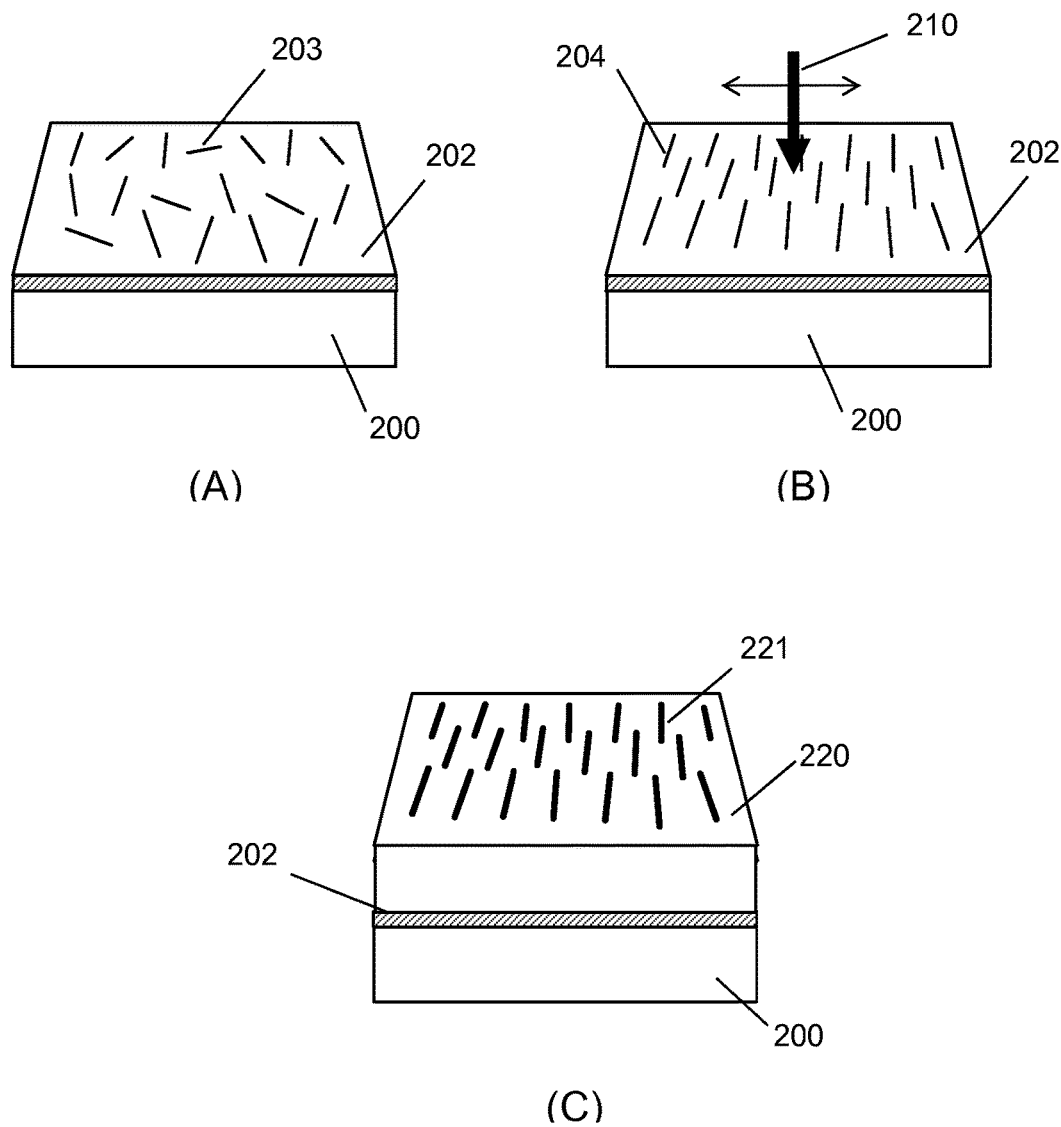
FIG. 2 schematically shows the method of producing photoaligned liquid crystal films: (a) coating a substrate with photoaligning material layer; (b) exposing to polarized UV light creates an anisotropy axis on the substrate; (c) depositing liquid crystal layer (including a polymerizable liquid crystal).
Figure 3:
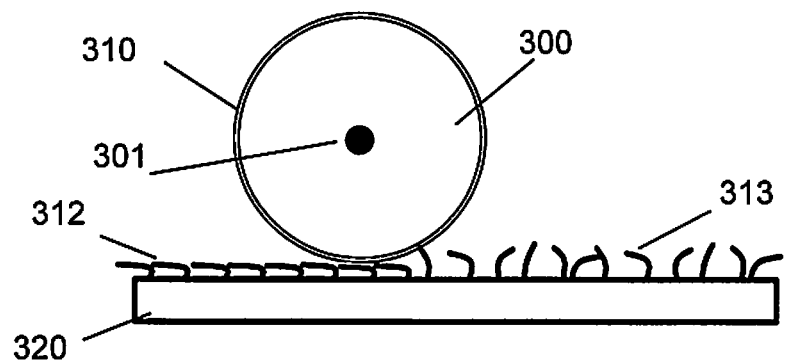
FIG. 3 schematically shows the method for creating orienting conditions for LCs by mechanical rubbing: the substrate carrying a polymer film (typically, polyimides) is translated under a rotating wheel covered by a rubbing surface (typically, a textile).

The method of aligning LCs due to mechanical rubbing, still the main technique used in fabrication of LCDs, is shown in FIG. 3. A wheel 300 with a rubbing film 310 wrapped around it, typically a textile, is rotating around an axis 301 such as the rubbing film 310 touches the surface of a substrate 320 carrying the alignment polymer layer 313, typically, a polyimide, poly-vinyl alcohol, etc. The substrate is translated along direction indicated by 321 exposing fresh areas of the polymer to the rubbing action. The process creates anisotropy due to aligning the polymer fragments 312 as well as scratching the surface of the polymer at nanoscale. This anisotropy is not only sufficient for aligning the LC layer that is coated on top of the film, but it often provides the strongest anchoring strength known in the LC technology.

A circular rubbing process can be used for obtaining axially symmetric alignment conditions for LCs. Microrubbing with a tip of an atomic force microscope can be used for creating cycloidally patterned alignment conditions. However, the latter is slow and applicable to rather small areas only.

Figure 4A:
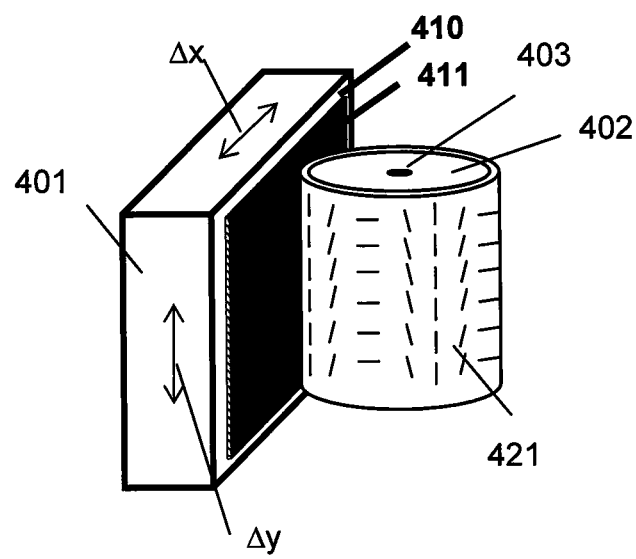
FIG. 4 schematically shows the concept for producing cycloidal orienting conditions due to mechanical rubbing: the rotating wheel in this case carries the alignment polymer while rubbing is performed by an oscillating substrate carrying the rubbing surface. The rubbing direction is rotated due to phase shift between oscillations along x and y axes.

In the preferred embodiment of the current invention shown in FIG. 4 the film 411 providing the rubbing is attached to a mechanical stage 401 providing oscillation with an amplitude A and at a frequency ($\omega$) optimized for the rubbing. Said stage is capable of 2D oscillations in the rubbing plane (x,y plane, for certainty). The oscillations along the x and y axes are programmed to provide effective rotation of the rubbing direction at a frequency ($\Omega$) determined by the period of the orientation structure to be produced, $$\Delta x = A \cos(\omega t)\cos(\Omega t)$$

$$\Delta y = A \cos(\omega t)\sin(\Omega t)$$

Thus the rubbing angle $\alpha$ is changing as $\Omega t$ with time t.

Figure 4B:
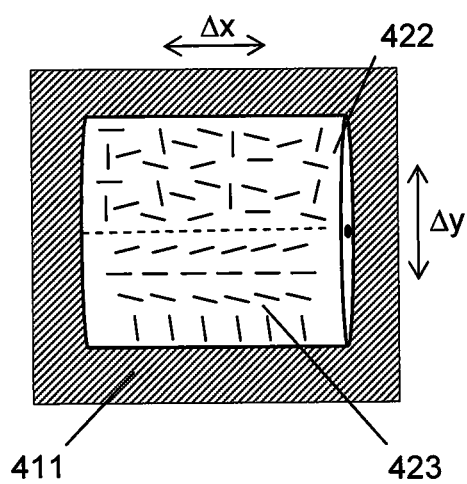

The alignment polymer 421 is coated on a cylinder 402 that is brought in touch with the oscillating rubbing film 411 that is attached to the surface 410 of the mechanical stages that generate the oscillatory motion. The cylinder 402 is rotating around axis 403 exposing different linear areas of the alignment film to the rubbing at different angles. FIG. 4B presents a view of the alignment polymer with oriented parts 423 and a part still not rubbed 422.

Conventional commercially available textile materials well-known in the prior art can be used for providing the rubbing film 411. For example, these include velvets.

Conventional commercially available materials such as polyimides and poly-vinyl alcohol (PVA) can be used as alignment layer. The alignment layer, typically of submicron sizes, can be deposited on a substrate in a number of techniques, including spin-coating, dip coating, printing, etc. For example, 0.5 wt. % solution of PVA in distilled water can be spin coated on a glass substrate by spinning at 3000 rpm for a 60 s.

To produce strong rubbing, the oscillation frequency $\omega$ shall be chosen higher than the rotation frequency $\Omega$. For example, one can chose $\Omega=1$ Hz while $\omega=10\Omega=10$ Hz. The specific values for frequencies as well as the oscillation amplitude should be experimentally optimized for best conditions for specific rubbing cloth, velour, rayon, etc.

A desired effective rubbing length L, by that, is obtained for N=L/4 A full oscillation. For example, to obtain 100 cm effective rubbing length with a 1 cm oscillation amplitude, the number of full oscillations N shall be equal to 25. At 10 Hz oscillation frequency, it will require 2.5 s effective rubbing time.

Figure 5:
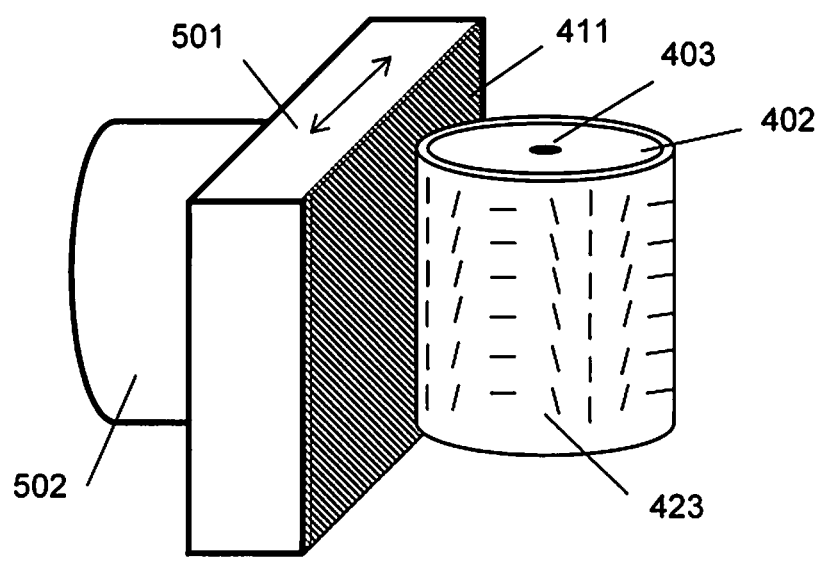
FIG. 5 schematically shows a system wherein a one-dimensional translation stage is rotated by a rotation stage around the axis perpendicular to the translation plane.

In another embodiment shown in FIG. 5, the stage 401 with the oscillation capability in two dimensions is replaced by a single-axis translation stage 501 mounted on a rotation stage 502.

Figure 6:
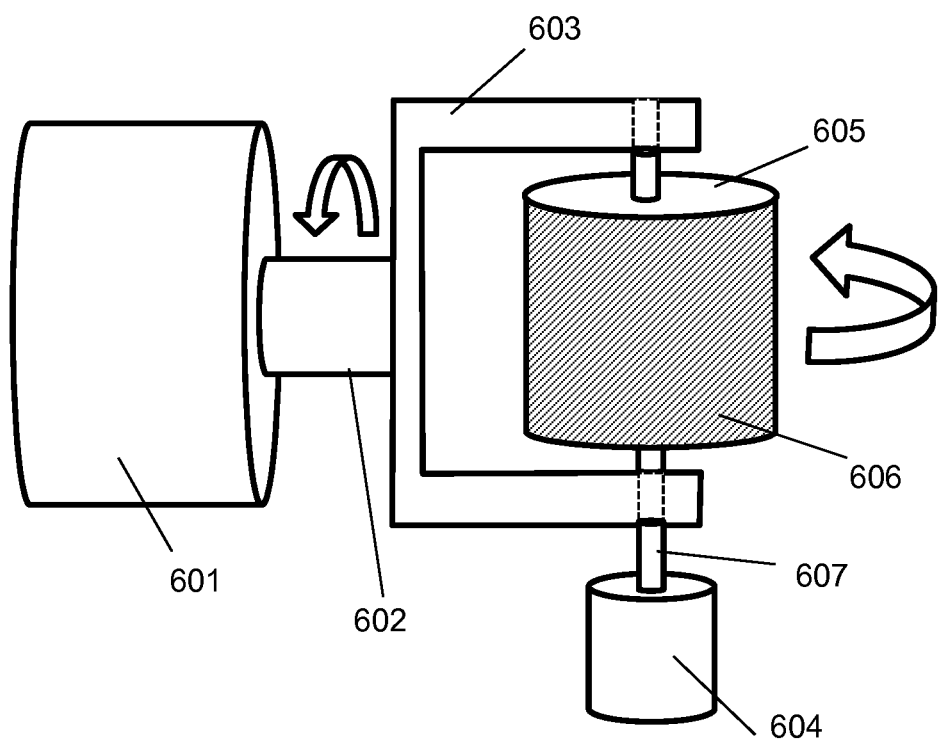
FIG. 6. schematically shows a rubbing drum simultaneously rotated around two axes.

In another preferred embodiment shown in FIG. 6, the stage 401 providing 2D oscillations is replaced by a rubbing drum continuously rotating around two axes. In an example of realization of such 2D rotation shown in FIG. 6, the drum 605 with the attached rubbing layer (rubbing cloth) 606 is continuously rotated with the motor 604. The rotation axle 607 is mounted onto a frame 603. The frame 603 is mounted on a platform 602 that is brought into rotation by the motor 601. The arrows in FIG. 6 indicate the rotation directions around the two orthogonal axes. The diameter of the drum with rubbing layer and the frequency of its rotation can be chosen according to the required rubbing conditions. For example, the drum 605 can have a diameter of 50 mm and be rotated around the axis 607 at 100 rpm. The rotation frequency around the axis 602 can be chosen according to the required pattern.

The oscillation and rotation can be at constant frequencies or be modulated in time to produce nonlinear alignment patterns. For example, the rotation frequency around the axis 602 can be accelerated to produce parabolic variation of alignment axis on the rubbed surface.

Figure 7:
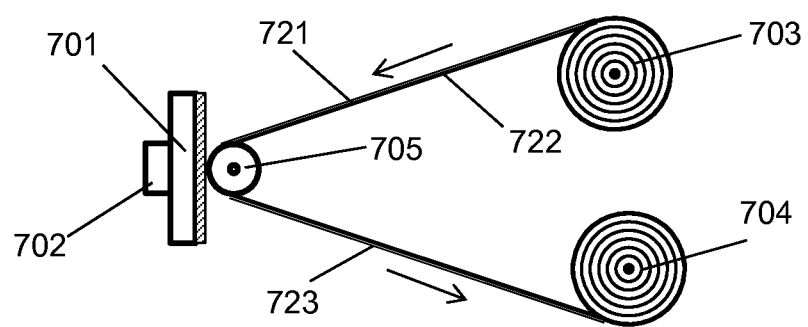
FIG. 7 schematically shows an alignment film spool-wound and pulled across to a take up spool such as only a line of the film touches the rubbing film at any given time.

The cylinder 402 carrying the alignment material in FIG. 4 and FIG. 5 is shown for illustration of the concept. In another preferred embodiment shown in FIG. 7 the rubbing is performed in a roll-to-roll type of process. For example, the band of a polymeric substrate 722 carrying the alignment layer 721 and rolled around the first drum 703 is translated to the second drum 704 while being stretched around a support rotating disk 705. It is rubbed then with the 2D rubbing system, for example, comprising a 1D oscillation stage 701 rotated by the motor 702. Instead, the system shown in FIG. 6 can be used indeed. The rubbed film 723 then is rolled around the axis of the drum 704. During the translation, the film may be subject to additional processes such as deposition of additional coatings. These coatings, for example, can be polymerizable liquid crystals such as, for example, RMS series materials from Merck.

Although the present invention has been described above by way of a preferred embodiment, this embodiment can be modified at will, within the scope of the appended claims, without departing from the spirit and nature of the subject invention.

What is claimed is:

1. A rubbing method for producing liquid crystal diffractive waveplates, the method comprising the steps of:
   (a) providing a rubbing film on a plane substrate;
   (b) mechanically translating said rubbing film;
   (c) controlling translation speed and direction of said rubbing film along two orthogonal coordinates;
   (c) an alignment film over a cylindrical substrate; and
   (d) mechanically rotating said alignment film across the rubbing film such as they are in touch along a single line at any given time, wherein the method produces the liquid crystal diffractive waveplates.

2. The method as in claim 1 wherein said mechanically translating of said rubbing film comprises a two-dimensional oscillating capability.

3. The method as in claim 1 wherein said mechanically translating said rubbing film comprises a stage with one-dimensional oscillating capability combined with a rotation.

4. The method as in claim 1 wherein said mechanically translating of said rubbing film comprises:
   (a) a substrate;
   (b) a first rotation assembly comprising a cylinder and a rotation stage rotating said cylinder around a first axis;
   (c) a frame for mounting said first rotation assembly on a second rotation assembly that provides rotation of the first rotation assembly around an axis orthogonal to the rotation axis of the first rotation assembly.

5. The method as in claim 1 wherein said controlling the translation speed and direction of said rubbing film along two orthogonal coordinates comprises electronically controlled translation stages with programmable acceleration.

6. The method as in claim 5 wherein said electronically controlled translation stages change the translation direction of said rubbing film in a nonlinear fashion as a function of time.

7. The method as in claim 1 wherein the alignment film is a polymer selected from a group of materials that include polyimides and Poly-Vinyl-Alcohol.

8. The method as in claim 1 wherein the alignment film is coated on a flexible support substrate.

9. The method as in claim 8 wherein said support substrate carrying said alignment film has a portion shaped as a cylinder.

10. The method as in claim 8 wherein said alignment film on said support substrate is spool-wound and is pulled across to a take up spool such as only a line of the film touches the rubbing film at any given time.

11. A method for fabricating patterned waveplates wherein the alignment film prepared according to claim 10 is further coated by a polymerizable liquid crystalline material followed by polymerization before the film reaches the take up spool.

12. The method for fabricating patterned waveplates as in claim 11 wherein said polymerizable liquid crystal is deposited on rubbed alignment layer from a solution chosen from a group of materials comprising alcohols, propylene glycol monomethyl ether acetate (PGMEA), cyclopentanone, and toluene, Dimethylformamide (DMF).

13. The method for fabricating patterned waveplate as in claim 12 wherein said waveplate is a cycloidal waveplate.

14. The method for fabricating patterned waveplate as in claim 12 wherein said patterned waveplate has at least a portion with a parabolic profile of optical axis orientation change across the surface of the waveplate.

* * * * *